(12) United States Patent
Ushida et al.

(10) Patent No.: US 7,832,243 B2
(45) Date of Patent: Nov. 16, 2010

(54) APPARATUS FOR A SHOT PEENING TREATMENT

(75) Inventors: Koji Ushida, Aichi-ken (JP); Mitsuo Ishikawa, Aichi-ken (JP); Hiroaki Watanabe, Aichi-ken (JP); Hideaki Kaga, Aichi-ken (JP); Nobuyoshi Kawai, Aichi-ken (JP); Akikazu Yokoi, Aichi-ken (JP)

(73) Assignee: Sintokogio, Ltd., Aichi-Ken (JP)

( * ) Notice: Subject to any disclaimer, the term of this patent is extended or adjusted under 35 U.S.C. 154(b) by 770 days.

(21) Appl. No.: 11/596,846

(22) PCT Filed: May 19, 2005

(86) PCT No.: PCT/JP2005/009147

§ 371 (c)(1),
(2), (4) Date: Aug. 7, 2007

(87) PCT Pub. No.: WO2005/110680

PCT Pub. Date: Nov. 24, 2005

(65) Prior Publication Data

US 2008/0066512 A1     Mar. 20, 2008

(30) Foreign Application Priority Data

May 19, 2004  (JP) .................. 2004-148473
May 21, 2004  (JP) .................. 2004-152238

(51) Int. Cl.
*B24C 3/14*      (2006.01)
*B24C 7/00*      (2006.01)

(52) U.S. Cl. ................. 72/53; 29/90.7; 451/38

(58) Field of Classification Search ............ 72/53; 29/90.7; 451/38, 39, 101
See application file for complete search history.

(56) References Cited

U.S. PATENT DOCUMENTS

| 3,742,650 | A | 7/1973 | Graf et al. |
| 3,934,374 | A | 1/1976 | Leliaert |
| 4,000,061 | A | 12/1976 | Bowling et al. |
| 4,326,362 | A | 4/1982 | Williams et al. |
| 2002/0170327 | A1 | 11/2002 | Yamamoto et al. |
| 2008/0066512 | A1* | 3/2008 | Ushida et al. .......... 72/53 |

FOREIGN PATENT DOCUMENTS

| DE | 2 037 482 B1 | 4/1971 |
| GB | 1 328 398 A | 8/1973 |

(Continued)

*Primary Examiner*—David B Jones
(74) *Attorney, Agent, or Firm*—Finnegan, Henderson, Farabow, Garrett & Dunner, L.L.P.

(57) ABSTRACT

A shot-peening device(s) is installed on a side of a cabinet defining an ejection chamber in the cabinet. Shots ejected from the device to a workpiece fall and are conveyed in a horizontal direction by a horizontal screw conveyor positioned above a lower end of the cabinet and then conveyed upward by a vertical screw conveyor whose base end is above the lower end of the cabinet. The shots pass from an upper section of the vertical screw conveyor through a chute to reach an opening/closing gate. When the gate is opened and the shots are supplied to the device(s) for re-ejeciton, a portion of the shots is cause to overflow from the gate. The overflowed shots are caused to pass through a separator to remove impurities and then returned to the horizontal screw conveyor.

20 Claims, 7 Drawing Sheets

FOREIGN PATENT DOCUMENTS

| | | |
|---|---|---|
| GB | 1 349 541 | 4/1974 |
| JP | 5-78473 | 10/1983 |
| JP | 59-120555 | 8/1984 |
| JP | 59187462 | 10/1984 |
| JP | 3-1762 | 1/1991 |
| JP | 5-329774 A | 12/1993 |
| JP | 8-216025 A | 8/1996 |
| JP | 11239973 | 9/1999 |
| JP | 2002326161 | 11/2002 |
| WO | WO 86/04289 A | 7/1986 |

* cited by examiner

APPARATUS FOR A SHOT PEENING TREATMENT

FIELD OF THE INVENTION

This invention relates to an apparatus for treating an object with shot particles.

BACKGROUND OF THE INVENTION

Shot-peening devices for projecting spherical particles, namely, shot particles, to the surface of a work piece to be treated, are known. Those devices include a nozzle-type device relevant to projecting the shot particles in relatively small volumes (e.g., Japanese Patent Early-Publication 2002-326161, assigned to the applicant) and an impeller-type device relevant to projecting them in relatively large volumes (e.g., Japanese Patent Early-Publication 11-239973).

An apparatus for a projection treatment equipped with a shot-penning device is one such as a shot-blasting machine or an air-blasting machine in which a workpiece is treated. In such an apparatus, the shot-penning device is mounted on a cabinet defining a projecting chamber therein. The shot-peening device projects short particles to a workpiece that is supported on a movable carriage. In such an apparatus, a circulation system for collecting the projected shot particles and returning them to the shot-peening device is also known (e.g., Japanese Patent Early Publication 59-187462 and the above-mentioned Japanese Patent Early-Publication 11-239973).

However, there is a problem in that the height of the apparatus disclosed in these publications is increased because a large circulation system is needed to collect the projected shot particles from the shot-peening device. In particular, in the shot-blasting machine with the impeller type shot-peening device, more particularly for the machine with plural devices, for projecting the shot particles in large volumes, the size of the circulation system is further increased and thus the machine needs the greater height. Accordingly, a large space is needed to install the blasting machine.

Further, the conventional circulation system in the blasting-machine is designed such that a collecting position in which the circulation system collects the shot particles that fall because of their own weight is located beneath the bottom end of a cabinet. Accordingly, a recess or a pit is needed in the area where the blasting machine is to be installed. Because the pit is located beneath the level of the floor or base on which the machine is to be installed, time and effort is necessary to construct such a pit.

Similarly, because the conventional blasting-machine is designed such that its lower portion to be received in the pit protrudes from the bottom end of the cabinet, the machine has an unstable stand when it is removed from the pit. Namely, such a design of the machine is inappropriate to transport and package the machine. To transport such an unstable machine, at least part of the machine should be reassembled. For example, to deliver the machine as the product to a user's factory from a manufacturer's firm, the following steps are needed. The machine is first trial assembled and temporarily installed to make a trial operation of it at the manufacturer's firm. Following the trial operation, the machine should be reassembled in order to transport it to the user's factory. In the factory, the delivered machine is re-assembled and installed, and this necessitates effort to construct the pit. Alternatively, say, any relocation of the user's factory means that the installed blasting machine should be transported to the new location and re-installed. In this case, the machine should be reassembled for transportation from the original location, and should be re-assembled and installed in a new location. This takes effort to construct the pit in the new location. Accordingly, it takes time and effort to both introduce a new machine and relocate it.

DISCLOSURE OF THE PRESENT INVENTION

Therefore, the object of the present invention is to provide an apparatus for a shot-peening treatment that is compact such that it can be installed in a relatively small space without a pit for installing it, and its transport can also be readily achieved.

The apparatus for the shot-peening treatment relating to the present invention includes 1) a housing having upper and bottom ends and defining the interior therein, 2) a movable carriage for movably supporting an object to be treated within the interior, 3) at least one projection means for projecting shot particles to the object supported by the carriage, and 4) a circulation system having a collecting level in which the projected and fallen shot particles are collected to return the collected shot particles to the projection means in order to recycle and use them for the projection.

Thus the apparatus of the present invention is characterized in that the collecting level is located at a level that is the same as or higher than that of the bottom end of the housing.

The circulation system includes at least one cross feeder. It is horizontally arranged at the collection position, for cross feeding the shot particles. It also includes at least one vertical feeder for upwardly feeding the shot particles that are cross fed by the cross feeder.

It also includes a diversion means for communicating with the cross feeder at the fixed position above the collecting level and has a closed position and an open position in which an aperture of it can be varied. The diversion means in the closed potion diverts all of the incoming shot particles that arrive at the fixed position by means of the vertical feeder, while the divider means in the open position divides some of the shots, based on the variable aperture, of the incoming shot particles that arrive at the fixed position by the vertical feeder. The diversion means returns the shot particles that are not diverted to the projection means.

It also includes removing means provided between the diversion means and the collecting level such that the shot particles that diverge from the diversion means pass through therein for eliminating impurities from these shot particles.

To further lower the height of the apparatus, preferably the fixed position, in which the diversion means is provided, is located under the upper end of the housing. In such an arrangement, the removing means may be located within the housing.

There is a plurality of each of the cross feeder, the vertical feeder, the projecting means, the diversion means, and the removing means. In such an arrangement, the shot particles are supplied to the respective projection means from the corresponding vertical feeder via its mating diversion means.

In the embodiments of the present invention, the cross feeder is a screw conveyor, horizontally arranged. The vertical feeder is a screw conveyor, substantially vertically arranged, or a bucket conveyor.

Decreasing the power of the vertical feeder is achieved to lower the level of the apparatus and thus to decrease the vertical traveling distance of the vertical feeder. To this purpose, preferably the level at which the removing means is located is substantially the same as or lower than that of the diversion means that communicates with the vertical feeder at the fixed position. In such an arrangement, the shot particles diverge from the diversion means in its opening position based on its overflow from its variable aperture from the diversion means such that they are readily introduced into the removing means.

In the embodiments of the present invention, the housing is provided with one or more elongated grooves along the traveling direction of the cross feeder. Therefore, one or more cross feeders is received in the groove at the collection level, which is located above the bottom end of the housing. The groove includes an inclined surface for guiding the shot particles to the cross feeder.

If plural cross feeders are provided, a plurality of the grooves may be provided, so that each groove receives one cross feeder such that the plural cross feeders are arranged in parallel to each other.

In this case, if too many shot particles flow into one groove, this causes an overload of the corresponding one cross feeder in the related one groove. To prevent such an overload of the cross feeder, preferably some means for spreading the shot particles to respective grooves is further provided.

Preferably, the projection means is attached to a sidewall of the housing such that the former is integrally provided with the latter. The projection means includes an impeller type shot-peening device or a nozzle type shot-peening device. The impeller type shot-peening devices may be arranged at the top and the bottom. The apparatus may include a shot-blasting machine, an air-blasting machine, or a shot-peening system.

In one embodiment of the present invention, a dust collector is mounted on an outer sidewall of the housing to suck the interior of the housing through a suction tube. The suction tube is preferably connected to a source for supplying an ignition suppressant in order to restrain any ignition of the dust within the dust collector.

Preferably, a plurality of flattened cartridge filters is arranged in the dust collector.

The carriage may use a conveyor type, a hanger type, a table type, or a drum type, carriage.

PREFERRED EMBODIMENTS OF THE INVENTION

The First Embodiment

Figure 1:
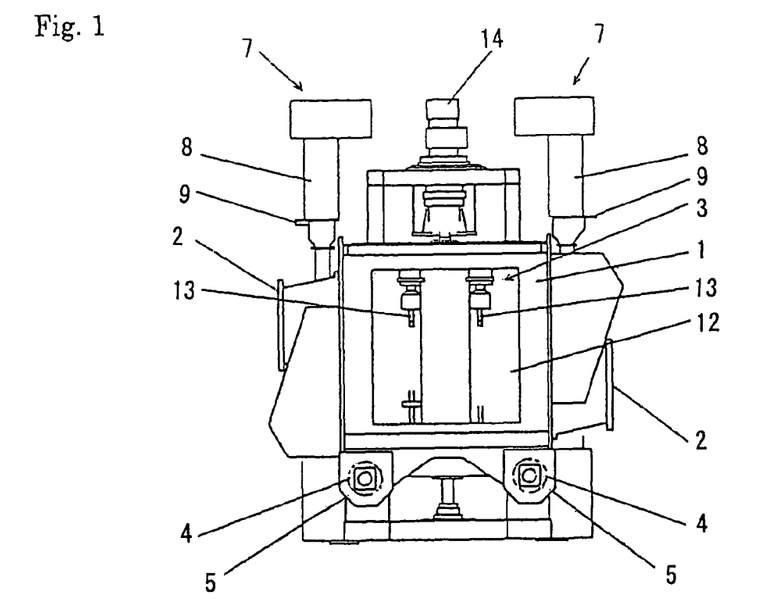
FIG. 1 is a schematic front elevation view of a shot-blasting machine of the first embodiment of the present invention.
Figure 2:
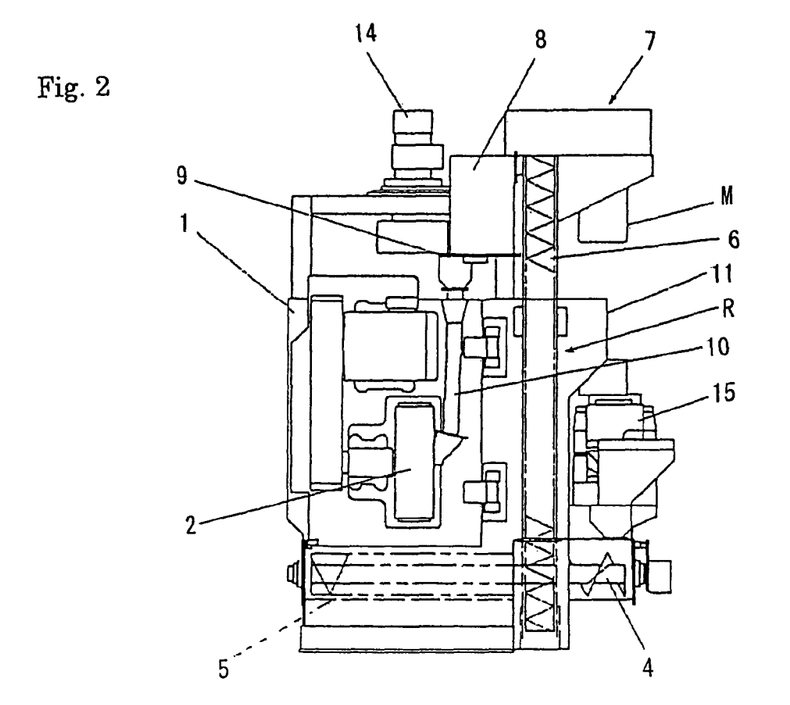
FIG. 2 is a schematic side view, partly in cross section, of the machine of FIG. 1.

FIGS. 1 and 2 show a shot-blasting machine as the first embodiment of the shot-peening treating system of the present invention. The shot-blasting machine includes a cabinet (or housing) 1 defining a projection chamber therein and two shot projecting means such as two impeller type shot peening devices 2 mounted on both sidewalls of the cabinet. Each shot-peening device 2 projects shot particles by means of the centrifugal force of an impeller. The shot-blasting machine also includes a hanger type, movable carriage 3 arranged in a projection chamber to suspend and transport a work piece (for example, a forge, a heat-treatment article) to be treated, and a shot circulation unit or system to collect the projected shot-particles and return them to the shot-peening devices 2.

In FIG. 2, the shot circulation unit denoted by R includes a pair of cross feeders or horizontal screw conveyers 4 for feeding the projected shot particles in a horizontal direction such that they are gathered on 1) the corresponding locations, each located outside the cabinet 1, and 2) a pair of vertical feeders or substantially vertical screw conveyors 6 for feeding the gathered shot particles upwards. The circulation unit also includes two shot separators 11. Each communicates with the respective vertical feeder such that it eliminates impurities from the shot-particles to be supplied to the respective shot-peening device 2. In FIG. 1, each vertical feeder 6 is shown as its cover 7, in which the vertical feeder 6 is enclosed.

The cabinet 1 is designed such that the shot-blasting machine can be installed without a pit, although the conventional shot-blasting machine needs such a pit for installing it in which a position for collecting the projected and fallen shot particles protrudes below the lower end of the cabinet 1. To this purpose, the lower part of the cabinet 1, view from the front, forms a W-shape as shown in, especially, FIG. 1. The lower part of the cabinet includes two parallel grooves 5 that extend in the traveling direction (the normal direction against the surface of FIG. 1) of the cross feeders. Each groove 5 has inclined surfaces for collecting the shot particles. The level of it corresponds to the collecting level in which the shot particles are collected, in this embodiment. In each groove 5, the respective cross feeder 4 of the circulation unit is arranged. The level of the bottom of the respective groove 5 is located at the same level as, or above, the level of the bottom end of the cabinet 1. (In this embodiment, the level of the groove 5 is located slightly above the bottom end of the cabinet 1.) Therefore, the bottom ends of the cross feeders 4 within the grooves 5 cannot project below the bottom end of the cabinet 1. The proximal ends of the vertical feeders 6 are also located above the bottom end of the cabinet 1. In other words, once the shot blasting machine of the present invention is installed, the bottom end of the cabinet 1, and thus the bottom ends of the cross feeders 4 and the proximal ends of the vertical feeders 6, will be located above the level of the floor (or a base) on which the shot blasting machine is to be installed. Therefore, the shot-blasting machine of the present invention needs no pit for its installation, and thus the installation and transportation of it can be readily achieved.

The inclined surfaces of the grooves 5 help to guide the projected and fallen shot particle to the cross feeders 4. The inclination of each inclined surface of the respective groove 5 is preferably from 20 to 40 degrees, in consideration of the angle of repose of the shot particle, and of the condition to readily guide the shot particles and thus to extend their life cycles. This is similar to the other embodiments.

In FIG. 2, a rotor M is drivingly connected to one side of the upper portion of the respective vertical feeder or vertical screw feeder 6. The other side of the upper portion of the respective vertical feeder 6 communicates with a chute 8. The lower end of the respective chute 8 is coupled to a diversion means such as an opening/closing gate 9 to open and close a passage for which the shot peening device 2 communicates with the vertical feeder 6 through the chute 8. The gate 9 has a closed position and an open position. By an aperture in the open position, the gate 9 can be variably regulated.

The lower end of the respective gate 9 is coupled to an inlet 10. In turn it is coupled to the corresponding shot peening device 2 for introducing the shot particles.

A removing means such as the respective separators 11 are arranged beneath the corresponding chute 8 such that a part of it is housed in the cabinet 1 at a level lower than the corresponding gate 9. Namely, the separators 11 are located under the upper surfaces of the cabinet 1.

In this embodiment, when the gates 9 open to supply the shot particles to the shot peening devices and thus to be projected therefrom, some of the shot particles from the respective gate 9 overflow in order to supply shot to the corresponding separator. However, if the gate 9 is in the closed position, then all the shot particles are supplied to the separator 11.

Again in reference to FIG. 1, the interior of the cabinet 1 defines a peening chamber 12. In it the shot particles are projected to a work piece to be supported on the movable carriage 3 and a carry-in-and-out passage (not shown). The movable carriage 3 includes hangers 13 arranged in the peening chamber and the carry-in-and-out passage, a revolving plate (not shown, but it is arranged in the upper side in the interior of the chamber 1) for rotatably suspending the hangers 13, and a motor 14 for rotating the revolving plate around its central axis of rotation (not shown). The movable carriage 3 also includes a rotating plate (not shown) that is connected to the hangers 13 and is arranged above the revolving plate, and a conventional motor (not shown) for rotating the rotating plate in the peening chamber 12.

The circulation unit R of the shot-blasting machine operates as follows. First, two of the impeller type shot peening devices 2 project the shot particles on work pieces that are supported by the hanger-type movable carriage 3 in the cabinet 1. The shot particles impact the work pieces and then fall under them because of their gravity. The fallen shot particles are guided on the inclined surfaces of a pair of the grooves 5 of the lower part of the cabinet 1 such that they are supplied to two of the cross feeders 4.

Because employing the compact cross feeders or the horizontal screw conveyers 4 in order to make the machine compact also reduces the transportation capacities, so some means to prevent an overload of them is desirable. To this purpose, for example, a partition is arranged in the central top of the W-shaped cross-section in the lower space in the cabinet 1. Because the fallen shot particles flow through the right an left grooves equally, the overload of the cross feeders 4 can be prevented. Alternatively, a passage may be provided to lead the shot particles that overflow from one groove to another groove. To prevent the overload of the cross feeders 4, it is preferable that the same quantity of the shot particles to be projected from the two shot peening devices 2 be the same.

Subsequently, the shot particles are cross-fed by two of the cross feeders 4, and thus are gathered at two places outside the cabinet 1. These gathered shot particles are then upwardly fed by the vertical feeders 6, and arrive at the gates 9 from the upper parts of vertical feeders 6 and pass through the chutes 8. When the gates 9 open to supply the shot particles to the shot-peening devices 2 for being projected again, some of the shot particles overflow from the gates 9 and are supplied to the separator 11. Therefore, because not all of the shot particles need to be supplied to the separator 11, it can be compact.

The blasting machine may be equipped with a classification device 15 in, e.g., the side of the cabinet 1 so as to classify the diameters of the shot particles. The shot particles that have been passed through the separators 11 to separate the impurities are transferred to the classification device 15 to further separate the impurities, and they are fed back to the cross feeder 4.

Because two of the cross feeders 4 are used in parallel, the height of one of them can be lower than that where just one large cross feeder is used. Furthermore, because the lower cross section of the cabinet 1 includes the plural grooves and thus the plural inclined surfaces, the lower part of the cabinet 1 can be more compact than where just one inclined surface is used to gather the shot particles to just one groove. Thus the entire cabinet 1 can have a low profile.

If all the shot particles are always supplied to the separator, a tall separator should be installed above the gates of the passages for the shot particles. Thus such a machine has a very great height. In this embodiment, when the gates 9 open to supply the shot particles to the shot peening devices 2 to be projected again, some of the shot particles overflow the gates 9, to be supplied to the separator 11, as described above. Accordingly, no tall separator need be installed above the gates of the passages for the shot particles. Therefore, the blasting machine can have a low profile. In addition, because the separator 11 can be located at a low position by the gates 9, the blasting machine can be more compact. Furthermore, the blasting machine can be more compact, since the separator 11 can be housed in the cabinet 1.

In this embodiment, two of the separators 11 are arranged, but just one separator may be used. In this case, the shot particles that overflow the gates 9, as described above, may pass through one separator, and may be distributed to two shot preening devices 2.

Although two of the shot-peening devices 2 are mounted on the opposed sidewalls one-by-one in this embodiment, they can be mounted on the opposed sidewalls two-by two, or two of the shot-peening devices 2 can be mounted on just one sidewall, above and below it.

Although impeller-type shot-peening devices are mounted on the top surface of the cabinet in the forgoing Japanese Patent Early-Publication No. 11-239973, two of the impeller-type shot-peening devices 2 are mounted on the sidewalls of the cabinet 1 in this embodiment. Because the impeller-type shot-peening device 2 is larger than a nozzle type shot-peening device for nozzle-jetting the shot particles with compressed air, it is preferable that they be mounted on the sidewalls of the cabinet 1, rather than the top surface of it, to reduce the height of the shot-blasting machine. However, the present invention is not limited to a blasting machine using the impeller-type shot—preening devices 2, as illustrated. The present invention may constitute, for example, an air-blasting machine device using nozzle-type shot-peening devices.

In the embodiment of the invention, the materials of the work piece to be treated may include ferrous metals, nonferrous metals, plastic, ceramics, glass, and materials of various kinds. However, if the impurities caused by the projection of the shot particles are excessive and if they exceed the capacity of the separators (eliminating means), some application may not result in a desirable effect. Therefore, the machine of the present invention is particularly suitable for an application in which the impurities caused by the projection of the shot particles to the work pieces are scarce, or an application for precision work pieces. For example, it is suitable for peening a forged product, for scaling a heat-treated product, and for removing a casting fin of a cast product.

The Second Embodiment

Figure 3:
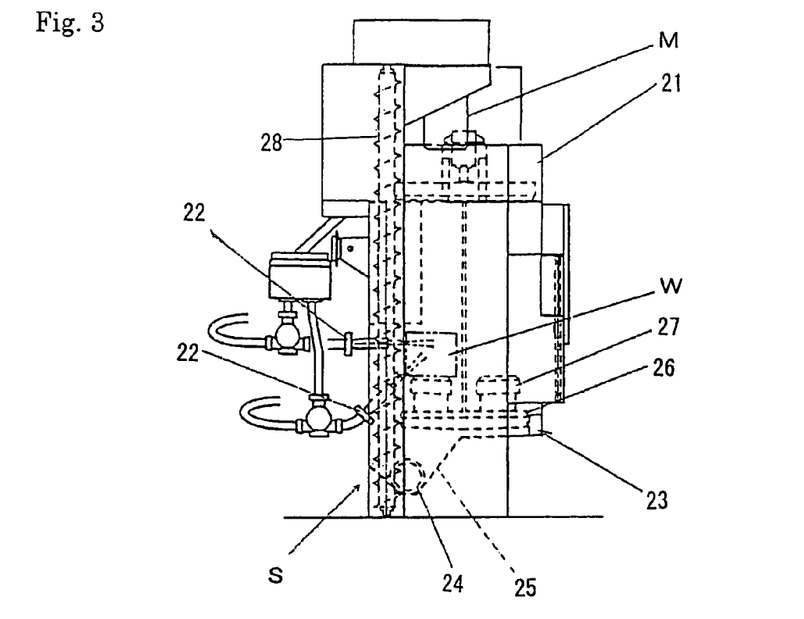
FIG. 3 is a schematic front elevation view, partly in cross section, of the air-blasting machine of the second embodiment of the present invention.

FIG. 3 shows a cross section of the air-blasting machine of the second embodiment of the present invention. This shot-blasting machine includes a cabinet (or a housing) 21, and two nozzle type shot-peening devices 22 mounted on the opposed sidewalls of the cabinet 21, a table type, movable carriage 23 located within the cabinet 1 for transporting a work piece W, and a circulation unit S for collecting shot particles that are projected to the work piece and for recycling them to the shot peening devices 22.

Like the cabinet 1 of the first embodiment, a groove 25 having inclined surfaces is provided in the lower part of the cabinet 21 of the second embodiment, to avoid having a pit for the installation of the machine. The second embodiment uses just one groove 25, although the first embodiment uses two grooves 5. In the groove 25, a horizontal cross feeder 24 is received such that the projected shot particles are gathered on one location on the outside of the cabinet 21. The cross feeder 24 is a horizontal screw conveyor, the same as the cross feeder 4 of the first embodiment. The traveling direction of the cross feeder 24 or the longitudinal direction of the groove is the normal direction against the surface, as in FIG. 3. The bottom end of the groove receiving the cross feeder 24 does not protrude from the bottom end of the cabinet 21. The bottom ends of the cabinet 21 and the cross feeder 24 (and the proximal end of a vertical feeder 28 as described below) will be located above the level of a floor (or a base) on which the machine is to be installed. Therefore, the machine needs no pit for its installation.

The movable carriage 23 includes a rotating table 26, and a driven table 27, which is located on the rotating table 26 such that they will be rotated in unison. The work piece W is loaded on the driven table 27, as illustrated by dashed lines in FIG. 3.

Figure 4:
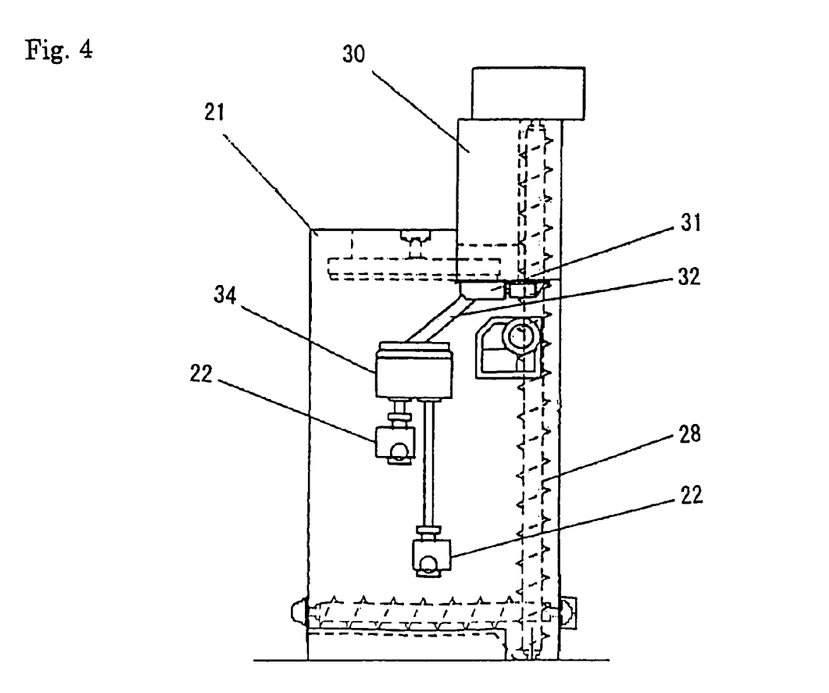
FIG. 4 is a schematic side view of the shot circulation unit of the machine of FIG. 3.

As shown in FIG. 4, the shot circulation unit or system S includes the forgoing cross feeder 24, the vertical feeder or vertical screw conveyor 28 for upwardly feeding the shot particles that are gathered on one location outside the cabinet 21 by the cross feeder 24, and one separator 33 (see FIG. 5), which communicates with the vertical feeder 28 such that it isolates impurities from the shot particles to be supplied to the shot-peening device 22. The proximal end of the vertical feeder 28 is located above the bottom end of the cabinet 21, like the vertical feeder 6 of the first embodiment.

The second embodiment is equipped with one cross feeder 24, one vertical feeder 28, and one separator 33, although the first embodiment is equipped with two cross feeders 4, two vertical feeders 6, and two separators 11.

A motor M is drivingly connected to one side of the upper portion of the vertical feeder or vertical screw conveyor 28. The other side of the upper portion of the vertical feeder 28 communicates with a chute 30. The lower end of the chute 30 is connected to a gate 31 to open and close a passage by which the shot-peening device 22 communicates with the screw conveyor 28 through the chute 30. The gate 31 is the same as the gate 9 in which a divergence in the open position is variably adjusted. The lower end of the gate 31 is connected to an inlet 32 which in turn is connected to the two shot peening devices 22 for introducing the shot particles via a distributor 34.

Figure 5:
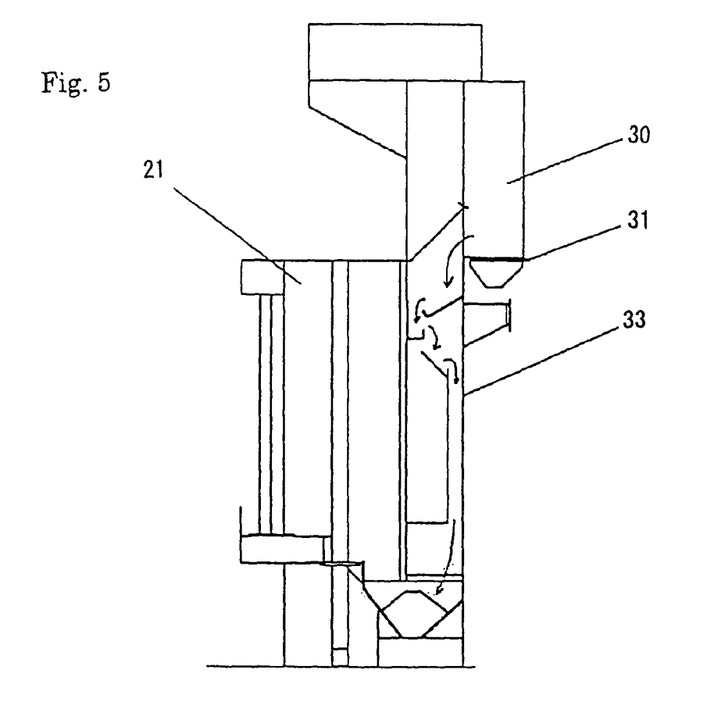
FIG. 5 is a schematic rear view of the shot separator used for the machine of FIG. 3.

As shown in FIG. 5, the separator 33 is arranged such that it communicates with the lower side of the chute 30, and a part of it is housed in the cabinet 21 at a level lower than the gate 31. Namely, the separator 33 is located under the upper surfaces of the cabinet 21.

In this embodiment, like the first embodiment, when the gate 31 opens to supply the shot particles to the shot peening devices 22 and thus to project them to the work piece therefrom, some of the shot particles from the gate 31 overflow in order to supply the overflow of the particles to the separator 33 via the chute 30. Therefore, because all the shot particles need not be supplied in the separator 33, it can be compact, like in the first embodiment.

The shot circulation unit or system S of the air-blasting machine of this embodiment operates as follows. First, two of the nozzle type shot peening devices 22 project the shot particles on a work piece on the driven table 27 of the movable carriage 23 in the cabinet 21. The shot particles impact the work pieces and then fall under it due to their gravity. The fallen shot particles are guided on the inclined surfaces of the groove 25 of the lower part of the cabinet 21 such that they are supplied to one cross feeder in the groove 25. Subsequently, the shot particles are cross-fed by the cross feeder 24, and thus are gathered at one place, outside of the cabinet 21. These gathered shot particles are then upwardly fed by the vertical feeder 28 that is located laterally of the cabinet 21, and supplied to the nozzle type shot peening devices 22 and the separator 33, via the gate 31 and the chute 30.

The shot particles that have been passed through the separator 33 to separate the impurities are fed back to the cross feeder 24.

In this embodiment, as described above, because the separator 33 of the circulation unit S is located beneath the top surface of the cabinet 21, the entire blasting machine can be compact.

The shot-peening devices 22 are not limited to the nozzle types. The present invention may constitute, for example, a shot-blasting machine using the inpeller-type shot-peening devices as described in the first embodiment.

The Third Embodiment

Figure 6:
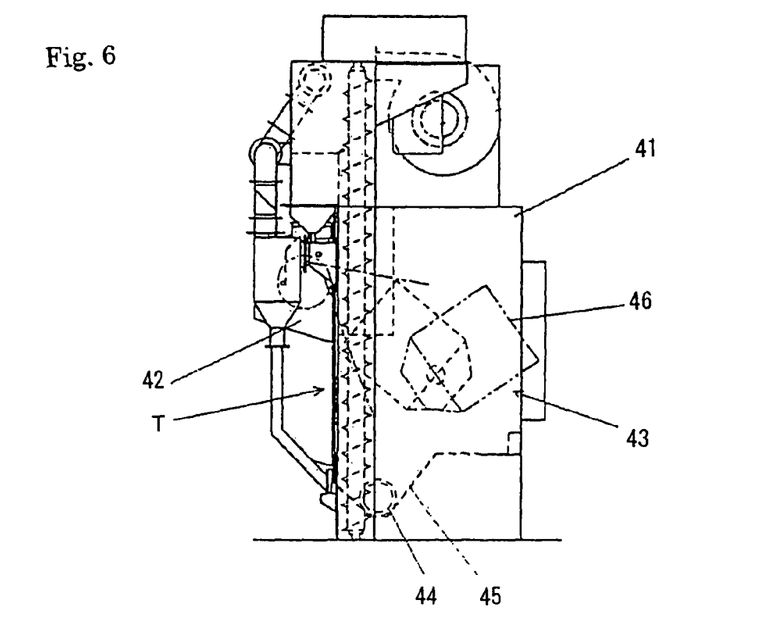
FIG. 6 is a schematic front elevation view of a shot-blasting machine of the third embodiment of the present invention.

FIG. 6 shows a cross section of the shot-blasting machine of the third embodiment of this invention. This shot-blasting machine includes a cabinet 41, one impeller type shot-peening device 42 mounted on one sidewall of the cabinet 41, a drum type, movable carriage 43 located within the cabinet 41 for supporting and transporting a work piece or wok pieces, and a circulation unit T for collecting shot particles that are projected to the work piece and for recycling them to the shot-peening device 42. The shot-peening device 42 is not limited to the impeller type. The present invention may constitute, for example, an air-blasting machine using one nozzle-type shot-peening device 22, as illustrated in the second embodiment.

Similar to the cabinet 21 of the second embodiment, a grove 45 having inclined surfaces is provided in the lower part of the cabinet 41 of this embodiment. Thus a pit for the installation of the machine is not necessary. In this grove, one horizontal cross feeder 44 is received such that the projected shot particles are gathered at one location outside of the cabinet 41.

The cross feeder 44 is a horizontal screw conveyor, the same as the first and second embodiments. Similar to the first and second embodiments, the bottom ends of the cabinet 41 and the cross feeder 44 (and the proximal end of a vertical feeder 47 as described below) will be located above the level of the floor (or a base) on which the machine is to be installed. Therefore, the machine needs no pit for its installation.

The movable carriage 43 includes a rotating drum 46, for transporting the work piece to a location where it will be processed by shot peeing.

Figure 7:
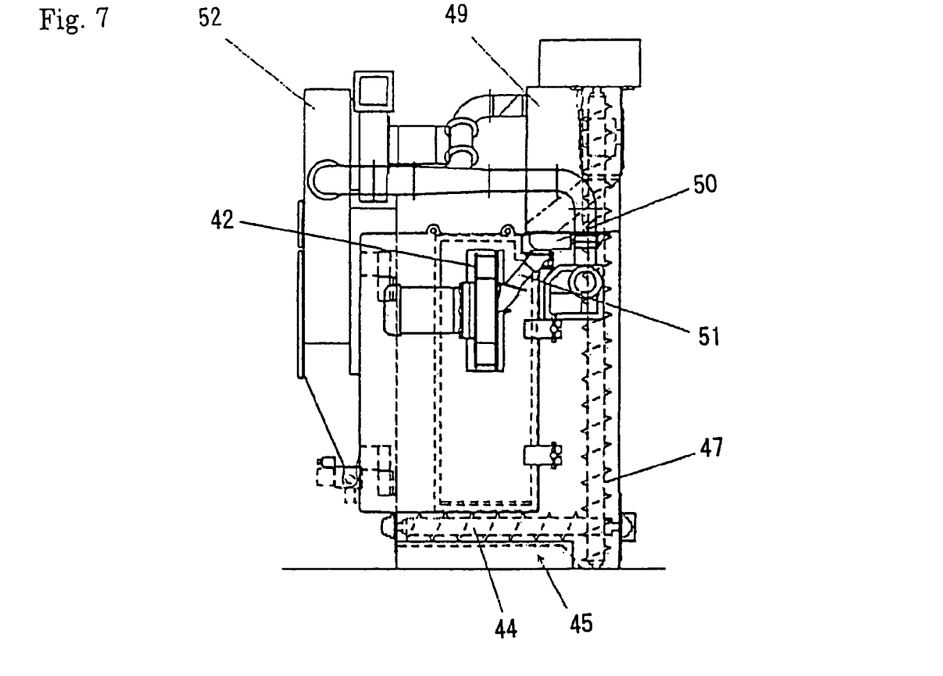
FIG. 7 is a schematic side view of the circulation unit of the machine of FIG. 6.

As shown in FIG. 7, the shot circulation unit T includes the foregoing cross feeder 44, one vertical feeder 47, which is located lateral to the cabinet 41, for upwardly feeding the shot particles that are gathered at the one location outside the cabinet 41 by the cross feeder 44, and one separator (not shown, but similar to the separator in the second embodiment), which communicates with the vertical feeder 47 such that it isolates impurities from the shot particles to be supplied to the shot-peening device 42. The vertical feeder 47 of this embodiment is a vertical screw conveyor whose proximal end is located above the bottom end of the cabinet 21, similar to the first and second embodiments.

A motor is drivingly connected to one side of the upper portion of the vertical feeder or vertical screw conveyor 47. The other side of the upper portion of the vertical feeder 47 communicates with a chute 49, whose lower end is connected to a gate 50 (similar to the gate 9 in the first embodiment) to open and close a passage for which the shot-peening device 42 communicates with the screw conveyor 47 through the chute 49. The aperture of the open position of the gate 50 is variably adjusted. The lower end of the gate 50 is connected to an inlet 51. In turn it is connected to the shot-peening device 42 for introducing the shot particles. The foregoing separator (not shown) is arranged such that it communicates with the lower side of the chute 49.

In this embodiment, similar to the second embodiment, when the gate 50 opens to supply the shot particles to the shot peening device 42 and thus to project them to the work piece therefrom some of the shot particles from the gate 50 overflow in order to supply the overflown particles to the separator via the chute 49. Therefore, because not all the shot particles need be supplied to the separator, it can be made compact similar to the second embodiment.

The shot-blasting machine of this embodiment also includes a dust collector 52. The dust collector 52 is integrally provided with the cabinet 41 such that it is fluidly connected to the interior of the cabinet 41. The dust collector 52 collects the dust in its lower part, in the environment where the air flows from the top down. To reduce the space necessary for installation it is desirable that the dust collector 52 be integrally provided with the shot-blasting machine. If the dust collector is spaced apart from the shot-blasting machine, the duct between them tends to stay open longer, and thus a wider space is needed for installation.

The circulation unit T of the blasting machine of this embodiment operates as follows. First, one impeller type shot peening device 42 projects the shot particles on a work piece or work pieces, which is or are supported by the movable carriage 43 in the cabinet 41. The shot particles impact the work piece(s) and then fall beneath it by gravity. The fallen shot particles are guided on the inclined surfaces of the groove 45 of the lower part of the cabinet 41 such that they are supplied to one cross feeder 44 in the groove 45. Subsequently, the shot particles are cross-fed by the cross feeder 44, and thus are gathered to one place outside of the cabinet 41. These gathered shot particles are then upwardly fed by the vertical feeder 47, and supplied to the impeller type shot peening device 42 and the separator, via the gate 50 and the chute 49.

The shot particles that have passed through the separator to separate impurities are fed back to the cross feeder 44. The dust collector 52 collects the dust, for example, produced from the collisions between the shot-particles and the work piece, in the cabinet 41.

The Fourth Embodiment

FIGS. 8 to 14 show the shot-blasting machine of the fourth embodiment of the present invention.

Figure 11:
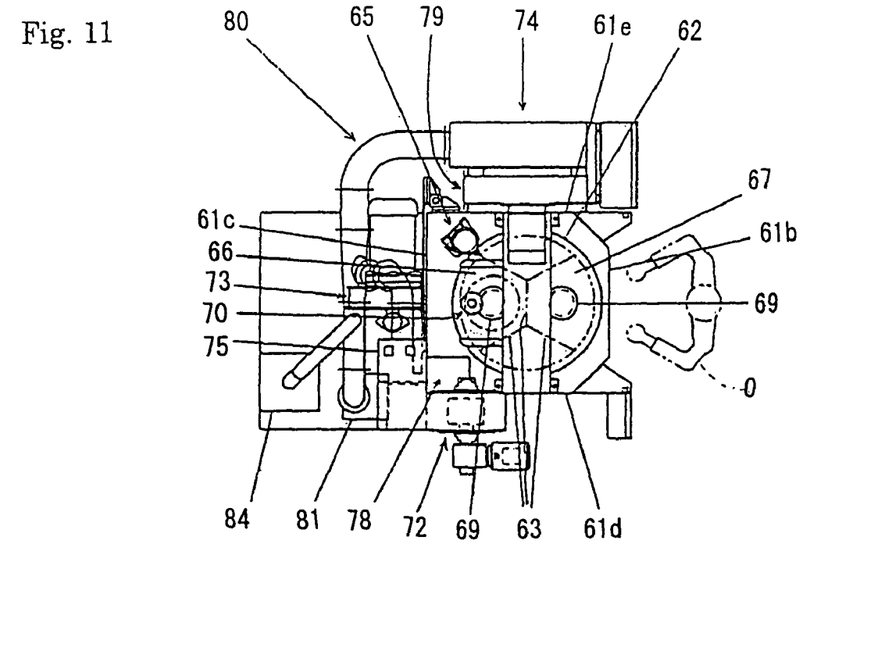
FIG. 11 shows a view along the line C-C of FIG. 8.

The upper and lower portions of a box cabinet 61, which has a carry-in-and-out opening 61*a* for a work piece or pieces W, are provided with revolving plates 62. The upper revolving plate 62 and the lower revolving plate 62 are connected to each other by a plurality of partitions 63 (FIG. 11). The upper and the lower revolving plates 62 are rotated around their revolving axes 64 by a common first motor 65 (FIG. 11).

The interior of the cabinet 61 is compartmented by the partitions 63 such that it defines a projection chamber 66, in which the peening of the work piece(s) W is done and a carry-in-and-out chamber 67 (FIG. 11) for the work piece(s) W.

One example of the movable carriage of this embodiment is, but is not limited to, a hanging holder, as illustrated. Hangers 68 (FIG. 8) are arranged in the projection chamber 66 and the carry-in-and-out chamber 67. The hangers 68 are rotatably suspended from the upper revolving plate 2 and are connected to a rotating plate 69 (FIG. 8) above the revolving plate 2. The rotating plate 69 is rotated by a second motor 70 (FIG. 11) in the project chamber 66.

Figure 9:
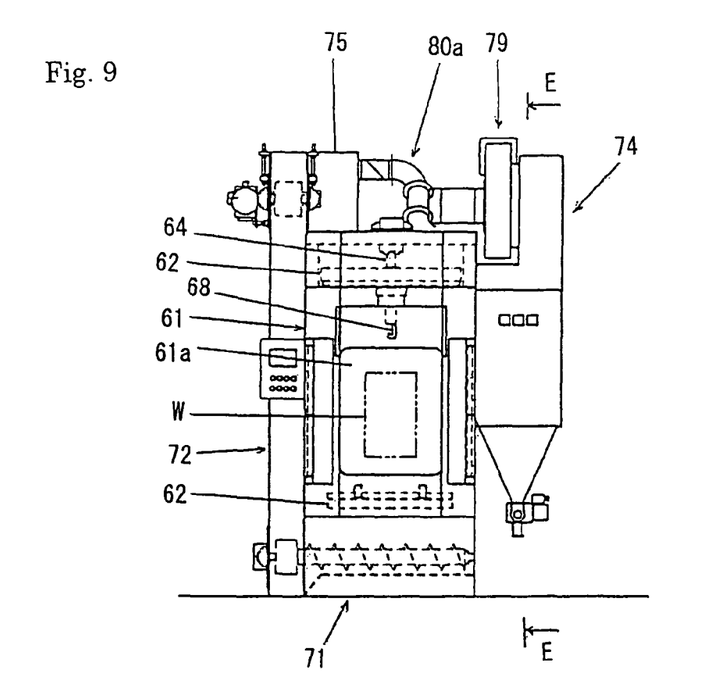
FIG. 9 shows a view along the line A-A of FIG. 8.

As shown in FIG. 9, a cross feeder or horizontal screw conveyer 71 for feeding the projected shot particles in a horizontal direction is received in a groove 61A having inclined surfaces in the lower part of the cabinet 61.

The leading end of the screw conveyor 71 is connected to the proximal end of a bucket elevator 72 for upwardly feeding the shot particles that are conveyed by the screw conveyor 71. This embodiment incorporates the bucket elevator 72 as a vertical feeder, although the first, second, and third embodiments incorporate the vertical screw conveyor. However, the shot-blasting machine of this embodiment can be compact, since it is connected to an outer sidewall of the cabinet 61, similar to the vertical screw conveyor of the first, second, and third embodiments.

The bottom end of the groove 61A, and thus the bottom surface of the cross feeder 71, is located slightly above the bottom end of the cabinet 61. The proximal end of the vertical feeder 72 is also located above the bottom end of the cabinet 61 (see FIGS. 8, 9, and 10). Accordingly, the machine needs no pit for installation.

As shown in FIG. 11, shot-peening devices 73 for projecting the shot particles that are conveyed by the bucket elevator 72 to the work piece(s) are mounted on the rear surface 61 (the side of the projection chamber 66) of the cabinet 61. The rear surface 61 is opposed to the front surface 61*b* having the opening 61*a* (the side where a standing operator O is illustrated). Although the shot-peening devices are illustrated as being impeller types, they may be replaced with nozzle types.

The bucket elevator 72 is connected to one side 61*d* that is perpendicular to the front surface 1*b* and the rear surface 61*c* of the cabinet 61. A dust collector 74 is connected to one side 61*e* that is opposed to the side 61*d* of the cabinet 61. In this embodiment, the dust collector 74 is integrally provided with the shot-blasting machine to reduce the space for installation.

Figure 10:
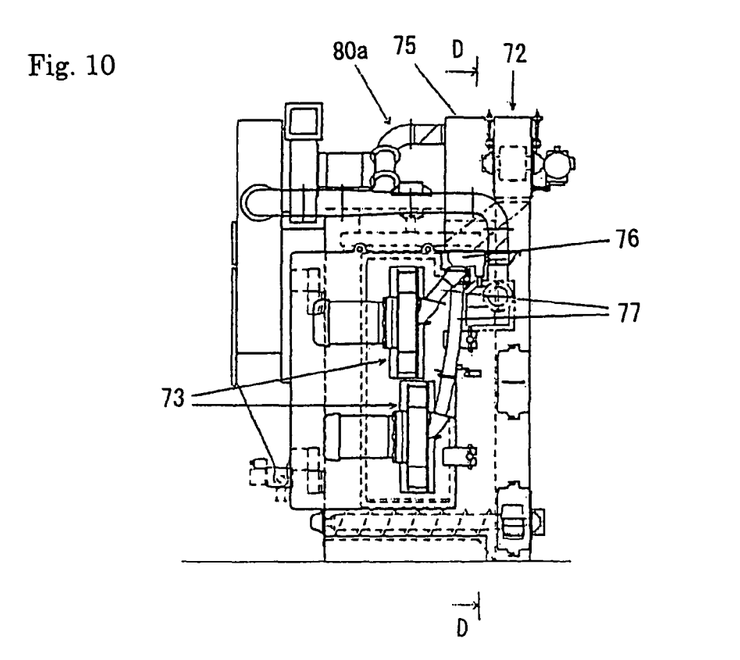
FIG. 10 shows a view along the line B-B of FIG. 8.

As shown in FIG. 10, the upper part of the bucket elevator 72 communicates with a chute 75. The lower end of the chute 75 is connected to a gate 76 to open and close a passage by which the shot peening devices 73 communicate with the bucket elevator 72 through the chute 75. The gate 76 has its closed position and open position, and a divergence in the opened position is variably adjusted. The lower end of the gate 76 is coupled to an inlet 77. In turn it is coupled to the respective shot-peening device 73 for introducing the shot particles.

Figure 12:
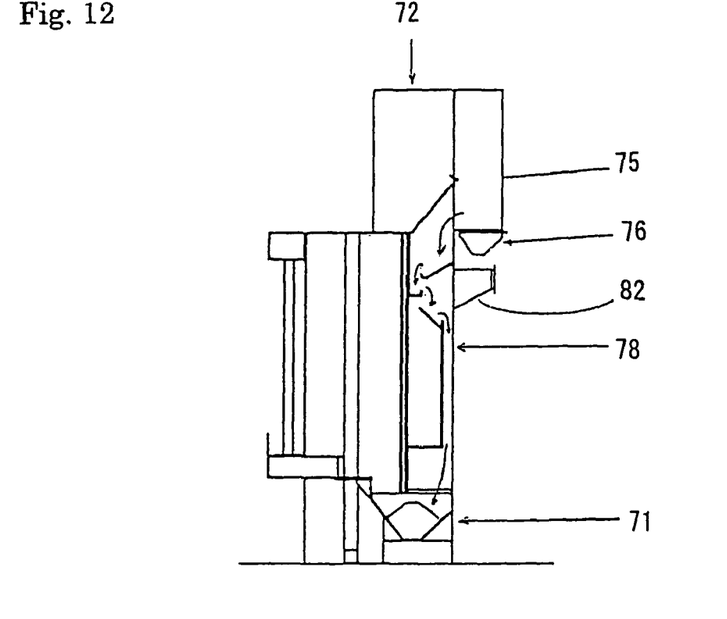
FIG. 12 shows a view of the circulation unit along the line D-D of FIG. 10.

As shown in FIG. 12, the chute 75 communicating with the gate 76 also communicates with a separator 78. The separator is, but not limited to, a known wind selection type separator, and may be replaced with a magnetic ore separator.

The separator 78 is housed in the cabinet 61 at a level lower than the gate 76. Namely, the separator 78 is located beneath the upper surfaces of the cabinet 61.

In this embodiment, similar to the forgoing embodiments, when the gate 76 is open to supply the shot particles to the shot-peening devices 73 and thus to project them to the work piece(s) W, some of the shot particles from the gate 76 overflow therefrom in order to supply the overflown volume to the separator 78 via the chute 30. Accordingly, the height of the shot-blasting machine can be lower than that of the conventional machine, and similar to the forgoing embodiments.

Figure 8:
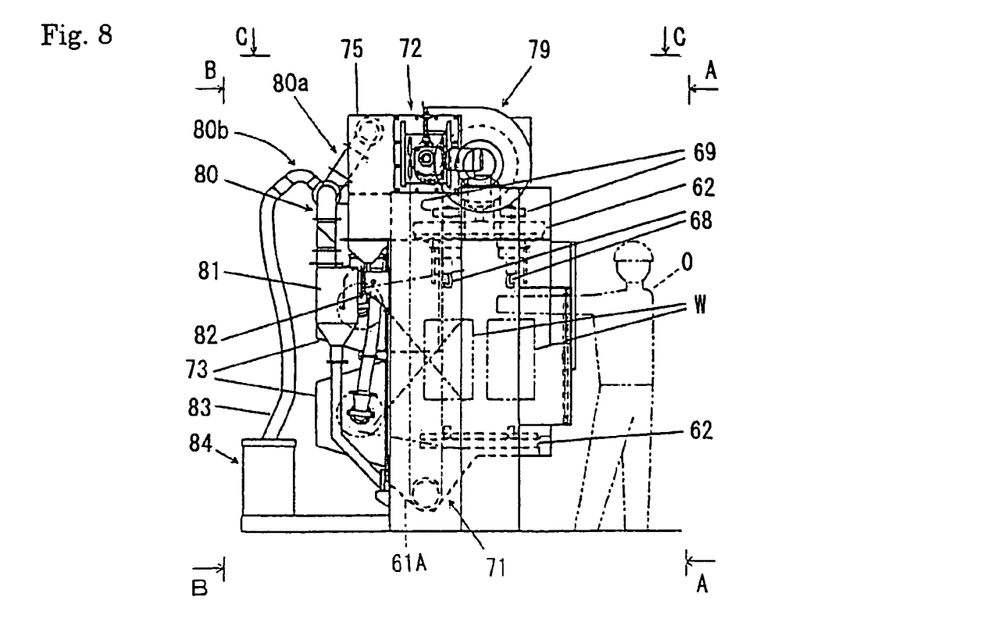
FIG. 8 is a front elevation view of a shot-blasting machine of the fourth embodiment of the present invention.

The upper outer sidewall of the dust collector 74 is connected to a blower 79 (FIGS. 9 and 11). A suction tube 80 is connected to one outer side, which is perpendicular to the outer side on which the blower 79 is connected, of the dust collector 74 (FIG. 11). The suction tube 80 is connected to a sedimentation chamber 81, and in turn it communicates with the separator 78 via a suction inlet 82 (FIG. 8). The dust collector 74 is connected to the chute 75 via a first divided duct 80*a*, which is divided from the suction tube 80 (see FIGS. 8, 9, and 10). Because the chute 75, as described above, communicates with the interior of the cabinet 61 via the bucket elevator 72 and the screw conveyor 71, the dust collector 74 can be sucked from the interior of the cabinet 61. A second divided duct 80*b* is divided from the suction tube 80 and is connected to a source 84 for supplying a retarding agent to retard the ignition phenomenon via a flexible hose 83.

Figure 13:
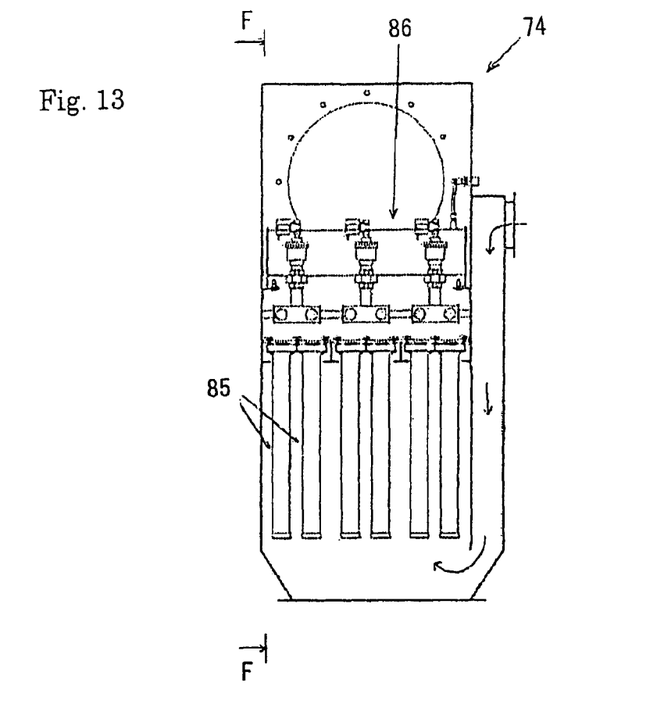
FIG. 13 shows a view of the dust collector along the line E-E of FIG. 9.
Figure 14:
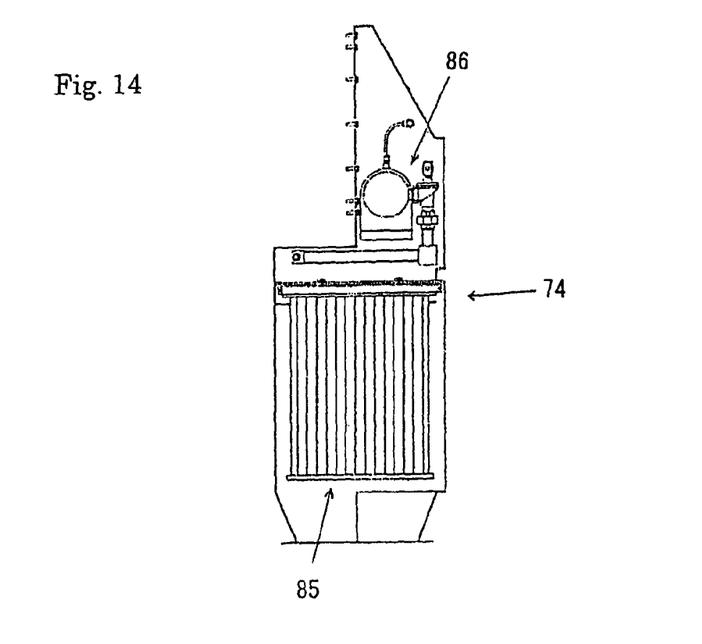
FIG. 14 shows a view of the dust collector along the line F-F of FIG. 6.

As shown in FIGS. 13 and 14, a plurality of cartridge filters 85, which can be detachably mounted on the dust collector 74, are arranged in lines. Preferably, each cartridge filter 85 is generally entirely flat. This causes the dust filter to be made compact, since if the respective cartridge filter 85 is flat the filling efficiency of the cartridge filters in the dust collector 74 can be increased and thus the filtration area can be increased, as compared to a non-flat or thick cartridge filter. Such a flat-shaped cartridge filter 85 is herein referred to as "the flat cartridge filter."

For air washing of the cartridge filters 85, a pulse-jet mechanism 86 to intermittently blow compressed air inside the respective filter 85 is arranged above the filters 85 in the dust collector 74.

The operation of the machine of the fourth embodiment will now be explained. First, the work piece W is suspended from one hanger 68 in the carrying-in-out chamber 67. The first motor 65 is then operated to rotate the revolving plates 62 about the revolving axes 64 by 180 degrees such that the work piece W moves in the projection chamber 61. The second motor 70 is then operated to rotate the rotating plate 69 of the projection chamber 66 such that the work piece W rotates in the projection chamber 66. Subsequently the gate 76 opens and thus the shot particles are projected on the rotating work piece W in the projection chamber 66 by the operation of centrifugal shot-peening devices 73. The projection of the shot particles to one work piece W is continued over a desired time. During the projection period of this one work piece W, the following work piece W to be processed is suspended from an empty hanger 68 in the carrying-in-out chamber 7 such that a plurality of work pieces can be continually processed.

The fallen shot particles from the projection chamber 66 are collected with the screw conveyer 71 such that they are transported to the bucket elevator 72. The shot particles are transported upward with the bucket elevator 72, such that they are dropped in the chute 75 for circulating. The transport volume of the bucket elevator 72 is set to become larger than the total projected quantity of the shot particles from the centrifugal shot-peening device 73. This causes some of the shot particles in the chute 75 to overflow the gate 76 when the shot particles are supplied into the shot-peening devices 73 by opening the gate 76. The overflown shot particles are supplied to the separator 78. However, while the first motor 65 is operated and thus the revolving plates are rotated, the gate 76 is in its closed position. Therefore, all the shot particles that are transported upward with the bucket elevator 72 and are dropped in the chute 75 in such a period are supplied to the separator 78.

The shot particles supplied to the separator 78 fall toward the direction designated by an arrow of FIG. 12 such that they are collected with the screw conveyer 71. At this time, the interior of the separator 78 is absorbed with the dust collector 74 through an absorption mouth 82 of the separator 78. This causes impurities to be carried on a current of air such that they are absorbed by the dirt collector 74 to separate them from the shot particles. These absorbed impurities flow into the sedimentation chamber 81 in which light materials, e.g., fines, of their same specific gravity, are absorbed with an absorption duct 80, and heavy materials, e.g., the shot particles that are reusable, of their same specific gravity, are returned to the screw conveyer 71.

After the projection of the shot particles for the work piece W is carried out over the desired time, the gate 76 is closed and the second motor 70 is stopped. Subsequently the first motor 65 is operated to revolve the revolving plates 62 around their revolving axes 64 by 180 degrees. Therefore, the work piece W that is finished with the projection processing is moved to the carrying-in-out chamber 67 from the projection chamber 66 while the following work piece W to be processed is moved into the projection chamber 66 from the carrying-in-out chamber 67.

The incoming work piece W to be processed in the projection chamber 66 is projected while it is rotating, the same as the processing for the preceding work piece W, as described above. During this projection, the work piece W that is in the carrying-in-out chamber 67 is carried out therefrom, while a further work piece W to be processed is next suspended from an empty hanger 68 in the carrying-in-out chamber 67.

By the forgoing processes being repeated, many work pieces W are treated.

During the operation of the shot-blasting machine, the operation of the blower 79 causes an absorption effect. Thus, the impurities are absorbed. They are such as fines from the absorption duct 80 and the first divided duct 80*a*. Gases, which include impurities, flow in the direction designated by the arrow in FIG. 13 into the dust collector 74. The gases that flowed in the dust collector 74 then flow into the insides of the plural flat cartridge filters 85 from their outsides. At this time, the gases coming into the insides of the filters 85 are purified, since the impurities in the gas stick to the outer surfaces of the filters 85. The gases that flowed in the insides of the filters 85 flow above from the upper openings (not shown) of the filters 85 as clean gases and are absorbed by the blower 79 to drain them to the outside of the machine.

The respective flat cartridge filter 85 is preferably backwashed, if desired, since the quantity of the impurities that adhere to the outer surface of it is increased, as the air purification is repeated. The backwashing of the flat cartridge filter 85 refers to washing to stop the blocking of impurities that have stuck to the outer surface of the filter 85 by the dust collection. To this purpose, compressed air is introduced into the inside of the filter 85 to be backwashed through its opening to cause the compressed air to flow from the inside to the outside of the filter 85. The adhering impurities on the outer surface are then exfoliated. In this embodiment, the pulse-jet mechanism 86, described above, is operated to blow the compressed air into the insides of the filters from their upper openings such that the filters are backwashed. This backwashing of the filters can be made intermittently during the operation of the shot-blasting machine.

The source 84 to supply the ignition restraint materials will now be explained. The source 84 contains a compressed-air sprayer (not shown). The source is also filled with calcium carbonate powder as ignition restraining materials. During the operation of the shot-blasting machine, the compressed-air sprayer blows compressed air into the interior of the source 84 every appointed time to stir up the calcium carbonate powder. This calcium carbonate powder that is stirred up is preferably sucked into the dust collector 74 through the flexible hose 83, the second divided duct 80*b*, and the absorption duct 80. Because the powdery dust density in the dust collector 74 can thus be weakened, any ignition of the powdery dust in the dust collector 74 may be prevented.

Although some of the embodiments of the present invention have been described, those skilled in the art can understand that the present invention is not limited to them, but various changes or modifications can be made without deviating from the sprit of the appended claims.

As examples of the movable carriage to support a work piece, the forgoing embodiment shows the hanger type (the first and the fourth embodiment), the table type (the second embodiment), and the drum type (the third embodiment), although those skilled in the art may optionally replace them. Alternatively, one may use, for example, a conveyer type. Depending on the form of the movable carriage or supporter, for example, it may be integrally provided with the cabinet, and it may be provided with a continuous accessway between the inside and the outside of the cabinet.

In the second, the third, and the fourth embodiments, one groove and one cross feeder in the lower part of the cabinet are employed, but they are not limited to such. Plural grooves and the corresponding plural cross feeders can be used, similar to the first embodiment. In this case, it is desirable to provide some means to prevent overload of the plural cross feeders, for example, the partitions in the first embodiment.

If the plural groves and the plural cross feeders are used, based on the shape of a work piece plural grooves that have different shapes and plural cross feeders that have different capacities may be used. However, it is preferable that the plural cross feeders have same capacity may be used in order to make the machine compact.

Because the shot-separators 11, 33 and 78 are located beneath the upper surface of the corresponding cabinet, each separator can be designed such make that it is completely received in the corresponding cabinet so that it cannot be seen from the outside of the cabinet.

The invention claimed is:

1. An apparatus for a shot-peening treatment comprising a housing having upper and bottom ends and defining an interior therein, a movable carriage for movably supporting an object to be treated within said interior, at least one shot projection means for projecting shot particles to the object supported on said carriage, a shot circulation system having a collecting level at which said projected and fallen shot particles are collected and returned to said shot projection means to recycle and use the collected shot particles for projection wherein said collecting level is located at a level that is the same as or above that of said bottom end of said housing, said circulation system having at least one cross feeder that is arranged horizontally at said collecting level, for cross feeding collected shot particles, and at least one vertical feeder for upwardly feeding the collected shot particles that are cross fed by said cross feeder, a diversion means that communicates with said vertical feeder at a fixed position above said collecting level and having a closed position and an open position, an aperture of which is adjustable, said diversion means in the closed position diverting all the collected shot particles that arrive at said fixed position by means of said vertical feeder, and in the open position diverting some of the shot particles, based on said adjustable aperture, of the collected shot particles that arrive at said fixed position by said vertical feeder, said diversion means returning the shot particles that have not been diverted to said shot projection means; and at least one removing means provided between said diversion means and said collecting level and disposed below said diversion means such that said shot particles that are diverted by said diversion means pass through therein for removing impurities from these shot particles, said removing means returning the shot particles therefrom to said cross feeder.

2. The apparatus of claim 1, wherein said fixed position in which said diversion means is provided is located beneath the upper end of said housing.

3. The apparatus of claim 2, wherein said removing means is located in said housing.

4. The apparatus of claim 3, wherein said cross feeder, said vertical feeder, said shot projecting means, said diversion means, and said removing means are all plural, and the shot particles that are not diverted are supplied to respective shot projection means from a corresponding vertical feeder and diversion means in an open position.

5. The apparatus of claim 1, wherein said cross feeder is a screw conveyor arranged horizontally.

6. The apparatus of claim 1, wherein said vertical feeder is a screw conveyor that is arranged substantially vertically.

7. The apparatus of claim 1, wherein said vertical feeder is a bucket conveyor.

8. The apparatus of claim 1, wherein the shot particles that are diverted by said diversion means in the open position based on its adjustable aperture overflow from said diversion means into said removing means.

9. The apparatus of claim 1, wherein said housing is provided with at least one elongated groove along a traveling direction of said cross feeder such that said at least one cross feeder is received in said groove at said collection level that is located above the bottom end of said housing, wherein said groove includes an inclined surface for guiding the shot particles to said at least one cross feeder.

10. The apparatus of claim 9, wherein a plurality of said grooves is provided so that each groove receives one cross feeder such that plural cross feeders are arranged parallel to each other.

11. The apparatus of claim 10, wherein said apparatus further includes means for distributing the shot particles to respective grooves.

12. The apparatus of claim 1, wherein said shot projecting means includes an impeller type shot-peening device or a nozzle type shot-peening device.

13. The apparatus of claim 12, wherein said apparatus is a shot-blasting machine, an air-blasting machine, or a shot-peening system.

14. The apparatus of claim 12 or 13, wherein said projection means is attached to a sidewall of said housing.

15. The apparatus of claim 14, wherein two impeller type shot-peening devices are arranged on said sidewall near an upper and lower portion of the housing.

16. The apparatus of claim 1, wherein said carriage is any of a conveyor, a hanger, a table, or a drum.

17. The apparatus of claim 1, wherein a dust collector is mounted on an outer sidewall of said housing to suck the interior of the housing through a suction tube.

18. The apparatus of claim 17, wherein said suction tube is connected to a source for supplying an ignition suppressant to restrain any ignition of the dust within said dust collector.

19. The apparatus of claim 17 or 18, wherein a plurality of flat cartridge filters are arranged in said dust collector.

20. The apparatus of claim 1, including a classification device between said removing means and said cross feeder to classify the size of the shot particles being returned.

\* \* \* \* \*